United States Patent
Park

(10) Patent No.: US 8,975,982 B2
(45) Date of Patent: Mar. 10, 2015

(54) APPARATUS AND METHOD FOR DETECTING TRANSMISSION AND RECEPTION SIGNAL

(75) Inventor: Dong Chan Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 639 days.

(21) Appl. No.: 13/171,884

(22) Filed: Jun. 29, 2011

(65) Prior Publication Data

US 2012/0013418 A1 Jan. 19, 2012

(30) Foreign Application Priority Data

Jul. 15, 2010 (KR) ........................ 10-2010-0068494

(51) Int. Cl.
*H01P 5/18* (2006.01)
*H04B 1/18* (2006.01)
*H01P 1/10* (2006.01)

(52) U.S. Cl.
CPC ....................................... *H04B 1/18* (2013.01)
USPC ........................................... 333/109; 333/101

(58) Field of Classification Search
CPC ................................... H01P 5/18; H01P 1/10
USPC .......... 333/109, 110, 111, 112, 116, 117, 101
See application file for complete search history.

(56) References Cited

U.S. PATENT DOCUMENTS

| | | | | |
|---|---|---|---|---|
| 5,363,071 A | * | 11/1994 | Schwent et al. | 333/111 |
| 6,329,880 B2 | * | 12/2001 | Akiya | 330/298 |
| 7,127,220 B2 | * | 10/2006 | Abrams et al. | 455/127.5 |
| 7,865,145 B2 | | 1/2011 | Neustadt et al. | |
| 2004/0132497 A1 | | 7/2004 | Weese | |
| 2009/0161586 A1 | | 6/2009 | Kasai et al. | |

FOREIGN PATENT DOCUMENTS

| | | |
|---|---|---|
| CN | 1315661 A | 10/2001 |
| CN | 1512691 A | 7/2004 |
| CN | 1896751 A | 1/2007 |
| CN | 101465865 A | 6/2009 |
| CN | 101509944 A | 8/2009 |
| JP | 2008-147934 A | 6/2008 |

OTHER PUBLICATIONS

Office Action dated Aug. 29, 2013 in Chinese Application No. 201110199699.5, filed Jul. 12, 2011.
Office Action dated Mar. 24, 2014 in Chinese Application No. 201110199699.5.

* cited by examiner

*Primary Examiner* — Dean Takaoka
(74) *Attorney, Agent, or Firm* — Saliwanchik, Lloyd & Eisenschenk

(57) ABSTRACT

Provided is a transmission and reception signal detecting apparatus, which includes a directional coupler and a signal detecting part. The directional coupler includes a first port and a second port. The signal detecting part is connected to the first and second ports of the directional coupler and detects an output of a first signal transmitted through the first port and an output of a second signal transmitted through the second port. The signal detecting part is connected to the first port under a first operation condition. The signal detecting part is connected to the second port under a second operation condition.

12 Claims, 5 Drawing Sheets

APPARATUS AND METHOD FOR DETECTING TRANSMISSION AND RECEPTION SIGNAL

CROSS-REFERENCE TO RELATED APPLICATION

This application claims the benefit under 35 U.S.C. §119 of Korean Patent Application No. 10-2010-0068494, filed 15 Jul. 2010, which is hereby incorporated by reference in its entirety.

BACKGROUND

Embodiments relate to a transmission and reception signal detecting system applied to an antenna circuit of a mobile communication terminal, and more particularly, to transmission and reception signal detecting apparatus and method for checking performance of the antenna circuit.

Mobile communication terminals include a radio frequency (RF) circuit for wireless communications, to transmit and receive an audio signal and a data signal through an antenna.

In particular, antennas, which are main parts for transmitting and receiving a signal and largely affect a call quality, are designed to satisfy a maximum transmission condition (50Ω matching), thereby optimally transmitting and receiving data. In addition, active research has been carried out on antennas having improved reception sensitivity to ensure transmission and reception performance.

The performance of an antenna may be evaluated using a voltage standing-wave ratio (VSWR). The VSWR is a voltage ratio measured at an adjacent node and an antinode in a waveguide or transmission line having a standing wave, or a ratio of a maximum standing wave amplitude to the minimum standing wave value. For example, a wave travelling in two media having two different impedances is divided into a forward wave and a reflected wave due to an impedance mismatch, and difference between the forward wave and the reflected wave causes the VSWR.

That is, if the VSWR is equal to 1, a line impedance completely matches with a terminal impedance, and an incident wave reaches a destination end without reflection. As the VSWR increases over 1, the amount of reflection increases. Thus, the VSWR is a main index for detecting a defect of an antenna.

Recently, research has been continually carried out on a transmission and reception signal detection system capable of more accurately measuring the VSWR to detect a defect of an antenna.

BRIEF SUMMARY

Embodiments provide a transmission and reception signal detecting apparatus that detects a plurality of signals with a single detector, thereby more accurately detecting signals with a minimum number of parts.

In one embodiment, a transmission and reception signal detecting apparatus includes: a directional coupler including a first port and a second port; and a signal detecting part connected to the first and second ports of the directional coupler and detecting an output of a first signal transmitted through the first port and an output of a second signal transmitted through the second port, wherein the signal detecting part is connected to the first port under a first operation condition, and the signal detecting part is connected to the second port under a second operation condition.

The first signal may be a transmission signal that is transmitted through an antenna, and the second signal may be a reflected wave signal that is received through the antenna.

The signal detecting part may include: a first switching part connected to the first port of the directional coupler; a second switching part connected to the second port of the directional coupler; and a voltage detector electrically connected to an end of the first switching part and an end of the second switching part to selectively detect the outputs of the first and second signals.

The first switching part may be turned on and the second switching part may be turned off under the first operation condition, and the voltage detector may detect the output of the first signal transmitted through the first switching part.

The first switching part may be turned off and the second switching part may be turned on under the second operation condition, and the voltage detector may detect the output of the second signal transmitted through the second switching part.

At least one of the first and second switching parts may include a single pole two throw (SP2T) switch.

The transmission and reception signal detecting apparatus may further include: a first terminator electrically connected to the other end of the first switching part; and a second terminator electrically connected to the other end of the second switching part.

At least one of the first and second terminators may include a termination resistor of about 50Ω.

The first terminator may be electrically connected to the first switching part under the second operation condition, and the second terminator may be electrically connected to the second switching part under the first operation condition.

The signal detecting part may measure a voltage standing wave ratio (VSWR) using detection values of the first and second signals sequentially obtained according to the first and second operation conditions.

The signal may include a radio frequency (RF) transmission and reception signal.

In another embodiment, a transmission and reception signal detecting method includes: setting a first operation condition; detecting a first signal that is output to an antenna according to the set first operation condition; changing the first operation condition to a second operation condition; and detecting a second signal that is reflected through the antenna according to the second operation condition.

The setting of the first operation condition may include: outputting a first switching signal for turning a first switching part on; and outputting a second switching signal for turning a second switching part off.

The setting of the second operation condition may include: outputting a third switching signal for turning the first switching part off; and outputting a fourth switching signal for turning the second switching part on.

The transmission and reception signal detecting method may further include connecting a terminator to an end of the first switching part or the second switching part according to the set operation condition.

The details of one or more embodiments are set forth in the accompanying drawings and the description below. Other features will be apparent from the description and drawings, and from the claims.

DETAILED DESCRIPTION

Figure 1:
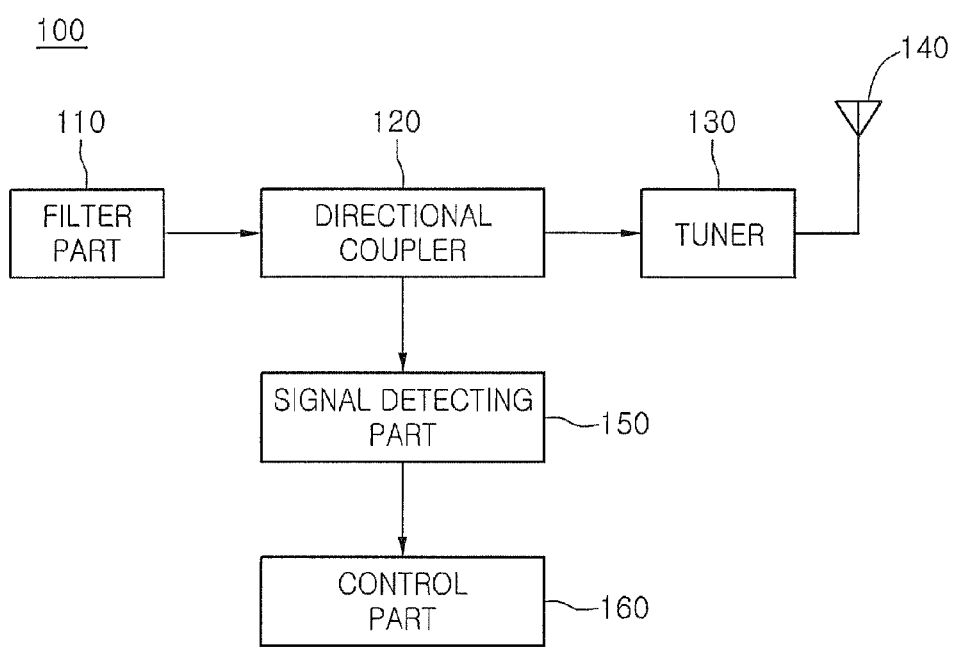
FIG. 1 is a block diagram illustrating a transmission and reception signal detecting apparatus according to an embodiment.

Since the present disclosure may have diverse modified embodiments, specific embodiments are illustrated in the drawings and are described in detail.

However, this does not limit the present disclosure within specific embodiments and it should be understood that the present disclosure covers all the modifications, equivalents, and replacements within the idea and technical scope of the present disclosure.

It will be understood that although the terms of first and second are used herein to describe various elements, these elements should not be limited by these terms. Terms are only used to distinguish one component from other components. Therefore, a component referred to as a first component in one embodiment can be referred to as a second component in another embodiment. The word 'and/or' means that one or more or a combination of relevant constituent elements is possible.

It will also be understood that when an element is referred to as being 'connected to' another element, it can be directly connected to the other element, or intervening elements may also be present. It will also be understood that when an element is referred to as being 'directly connected to' another element, there is no intervening elements.

In the following description, the technical terms are used only for explaining a specific exemplary embodiment while not limiting the present disclosure. The terms of a singular form may include plural forms unless referred to the contrary. The meaning of 'include' or 'comprise' specifies a property, a region, a fixed number, a step, a process, an element and/or a component but does not exclude other properties, regions, fixed numbers, steps, processes, elements and/or components.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

Embodiments of the present disclosure will be described below in more detail with reference to the accompanying drawings. For convenience of description and clarity, like reference numerals denote like elements throughout.

Figure 2:
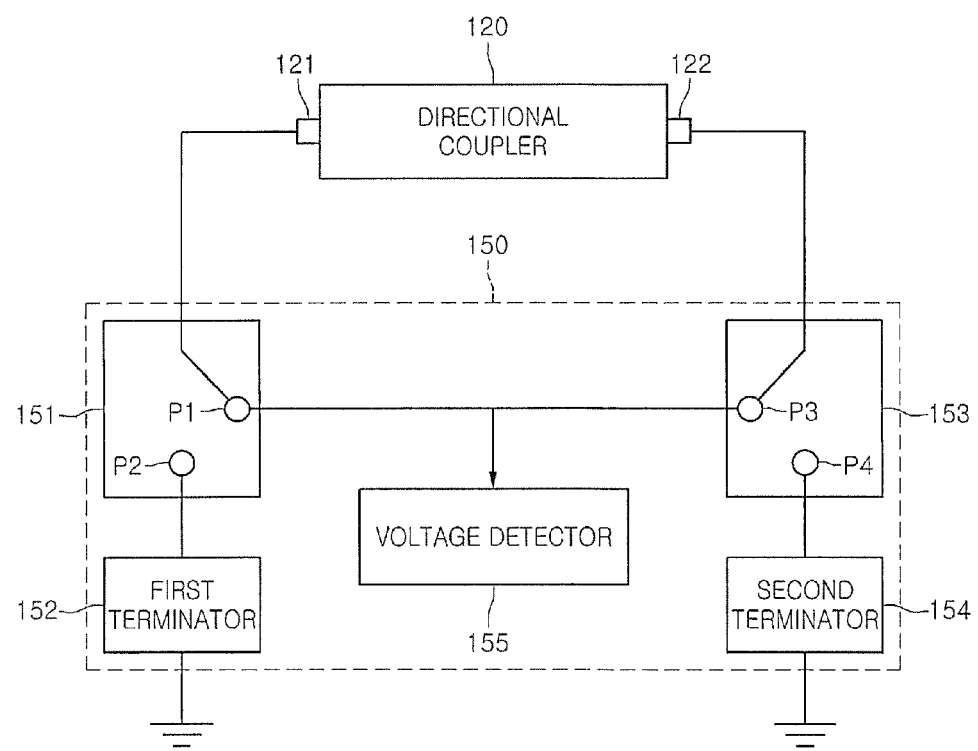
FIG. 2 is a block diagram illustrating a signal detecting part of FIG. 1.
Figure 3:
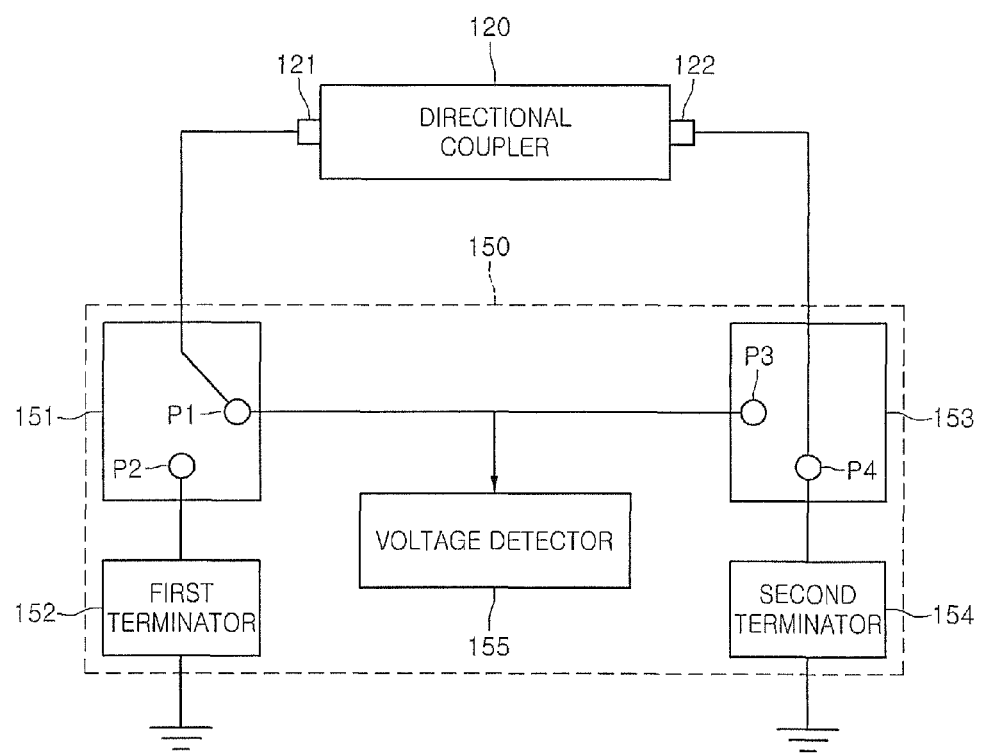
FIG. 3 is a block diagram illustrating a first operation of the transmission and reception signal detecting apparatus of FIG. 1.
Figure 4:
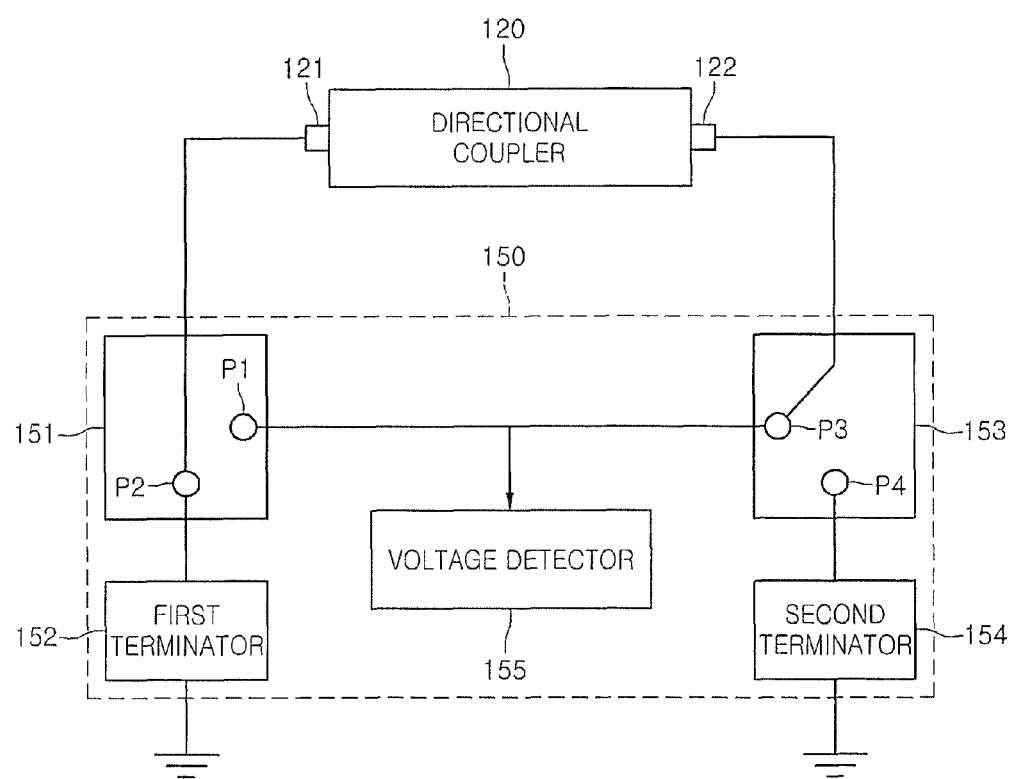
FIG. 4 is a block diagram illustrating a second operation of the transmission and reception signal detecting apparatus of FIG. 1.
Figure 5:
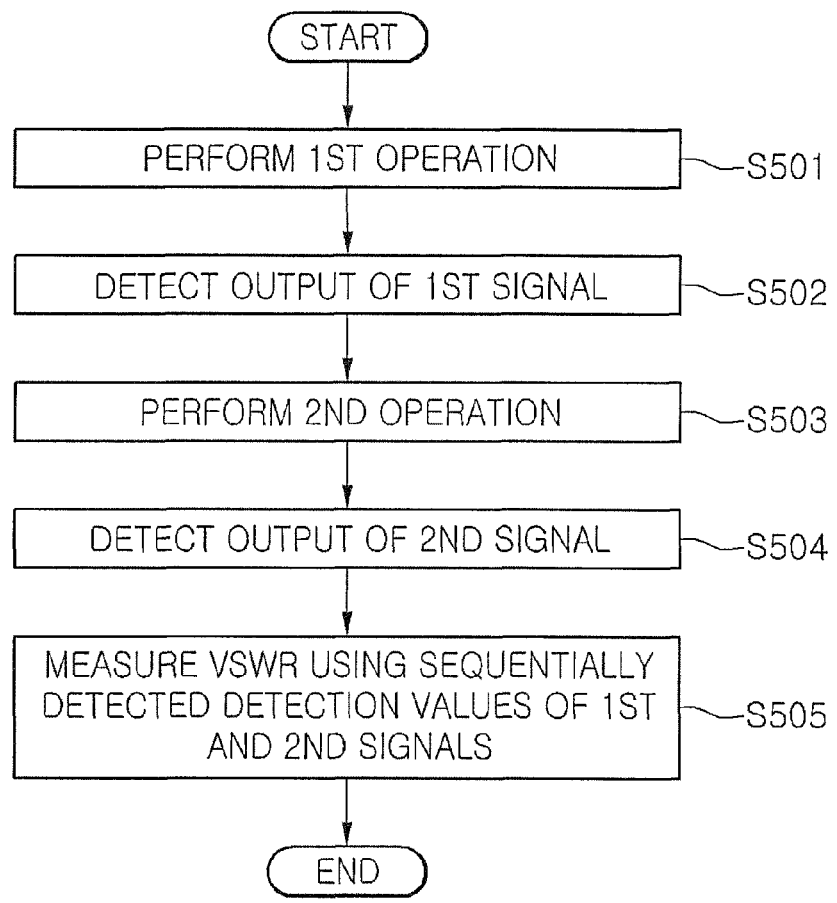
FIG. 5 is a block diagram illustrating the sequential operations of the transmission and reception signal detecting apparatus according to an embodiment.

FIG. 1 is a block diagram illustrating a transmission and reception signal detecting apparatus according to an embodiment. FIG. 2 is a block diagram illustrating a signal detecting part of FIG. FIG. 3 is a block diagram illustrating a first operation of the transmission and reception signal detecting apparatus of FIG. 1. FIG. 4 is a block diagram illustrating a second operation of the transmission and reception signal detecting apparatus of FIG. 1.

Referring to FIGS. 1 to 4, a transmission and reception signal detecting apparatus 100 according to an embodiment includes a filter part 110, a directional coupler 120, a tuner 130, an antenna 140, a signal detecting part 150, and a control part 160.

The filter part 110 separates a transmission and reception signal to selectively pass an intended frequency corresponding to the transmission and reception signal.

The filter part 110 may include a front end module.

The front end module includes an antenna switching module (ASM) and a surface acoustic wave (SAW) filter to selectively pass the intended frequency corresponding to the transmission and reception signal.

The transmission and reception signal may be a radio frequency (RF) transmission and reception signal, but is not limited thereto. Thus, the transmission and reception signal may include at least one of a VHF transmission and reception signal and a UHF transmission and reception signal.

The transmission and reception signal detecting apparatus 100 may include an amplifier (not shown). The amplifier amplifies the transmission and reception signal and outputs the transmission and reception signal to the filter part 110.

A first signal to be transmitted through the filter part 110, the tuner 130, and the antenna 140 is provided to the signal detecting part 150 through coupling by the directional coupler 120.

A second signal that is a reflected wave signal of the first signal received by the antenna 140 is provided to the signal detecting part 150 through coupling by the directional coupler 120.

To this end, referring to FIG. 2, the directional coupler 120 includes a first port 121 and a second port 122.

The first port 121 is a port for supplying the first signal to the signal detecting part 150, and the second port 122 is a port for supplying the second signal to the signal detecting part 150.

That is, the directional coupler 120 receives the intended frequency corresponding to the transmission and reception signal separated and passed by the filter part 110.

The signal detecting part 150 receives the first and second signals provided through the directional coupler 120, and detects outputs of the first and second signals.

The first signal may be a transmission signal that is transmitted through the antenna 140, and the second signal may be a reflected wave signal of the first signal, which is received through the antenna 140.

Accordingly, a detection value of the first signal may be a forward voltage Vforward, and a detection value of the second signal may be a reverse voltage Vreverse.

The signal detecting part 150 includes a first switching part 151, a first terminator 152, a second switching part 153, a second terminator 154, and a voltage detector 155.

The first switching part 151 selectively receives the first signal from the directional coupler 120. The second switching part 153 selectively receives the second signal from the directional coupler 120.

To this end, an end of the first switching part 151 is connected to the first port 121 of the directional coupler 120, and an end of the second switching part 153 is connected to the second port 122 of the directional coupler 120.

At least one of the first and second switching parts 151 and 153 may be constituted by an electromechanical switch including a single pole two throw (SP2T) switch.

The first terminator 152 is selectively connected to the other end of the first switching part 151. The second terminator 154 is selectively connected to the other end of the first switching part 153.

That is, the first terminator 152 is connected to the other end of the first switching part 151 under a second operation condition, and absorbs and removes a reflected component from the first signal.

The second terminator 154 is connected to the other end of the second switching part 153 under a first operation condition, and absorbs and removes a reflected component from the second signal.

To this end, at least one of the first and second terminators 152 and 154 may be constituted by a termination resistor of about 50Ω.

The voltage detector 155 is selectively connected to the other end of the first switching part 151 or the other end of the second switching part 153.

For example, the voltage detector 155 is connected to the other end of the first switching part 151 under the first operation condition to receive the first signal output from the first port 121 of the directional coupler 120.

The voltage detector 155 is connected to the other end of the second switching part 153 under the second operation condition to receive the second signal output from the second port 122 of the directional coupler 120.

In addition, for example, the other end of the first switching part 152 may be connected to an end P1 of the voltage detector 155, and the other end of the second switching part 153 may be connected to an end P4 of the second terminator 154, under the first operation condition.

The other end of the first switching part 151 may be connected to an end P2 of the first terminator 152, and the other end of the second switching part 153 may be connected to an end P3 of the voltage detector 155.

Accordingly, the voltage detector 155 detects outputs of the first and second signals that are selectively received according to operation conditions, and transmits a first detection value corresponding to the output of the first signal and a second detection value corresponding to the output of the second signal, to the control part 160.

The control part 160 controls the overall operation of the transmission and reception signal detecting apparatus 100. At this point, the control part 160 controls the signal detecting part 150 to sequentially obtain the first and second detection values. In addition, the control part 160 selectively supplies analog signals of the first and second detection values obtained by the voltage detector 155, to the tuner 130.

In this case, the control part 160 may include a micro controller unit (MCU) or an arbitrary computing device.

The voltage detector 155 or the control part 160 uses the first and second detection values to check performance of the antenna 140 and diagnose the antenna 140.

A reflection coefficient Γ, which is one of indices used to evaluate the performance of an antenna, depends on a difference between transmission power and reflection power, that is, depends on a return loss (RL) that is a difference between the first detection value and the second detection value. The reflection coefficient is determined using Equation 1 below.

$$RL = -20 \log |\Gamma| dB \quad \text{Equation 1}$$

A voltage standing-wave ratio (VSWR), which is another index for evaluating the performance of an antenna, may be determined using Equation 2 below.

$$VSWR = \frac{1+|\Gamma|}{1-|\Gamma|} = \frac{1+|Vreverse/Vforward|}{1-|Vreverse/Vforward|} \quad \text{Equation 2}$$

According to Equations 1 and 2, as a ratio of the detection value of the second signal to the detection value of the first signal, that is, a ratio of the reverse voltage Vreverse to the forward voltage Vforward increases, the VSWR increases. Thus, as the amount of reflection decreases, the VSWR approaches unity. In addition, as the amount of reflection increases, the VSWR approaches infinity. The VSWR is expressed as a ratio of two numbers. For example, if the VSWR is 3 according to Equation 2, the VSWR is expressed as '3:1'.

Hereinafter, an operation of the transmission and reception signal detecting apparatus 100 according to the current embodiment will now be described with components illustrated in FIGS. 1, 2, 3 and 4.

In operation S501, the transmission and reception signal detecting apparatus 100 may be in a first operation in which the transmission and reception signal detecting apparatus 100 operates under the first operation condition.

Under the first operation condition, an output of the first signal is detected from signals transmitted from the directional coupler 120. The first operation is illustrated in FIG. 3.

The control part 160 connects the other end of the second switching part 153 to the end P4 of the second terminator 154 to perform the first operation.

Then, the control part 160 connects the other end of the first switching part 151 to the end P1 of the voltage detector 155.

To this end, the control part 160 outputs a turn-on switching signal to the first switching part 151 such that the first switching part 151 is connected to the voltage detector 155. In addition, the control part 160 outputs a turn-off switching signal to the second switching part 153 such that the second switching part 153 is connected to the second terminator 154.

In operation S502, the voltage detector 155 receives the first signal transmitted by a turn-on operation of the first switching part 151, and detects an output of the first signal.

That is, the voltage detector 155 is connected to the first port 121 of the directional coupler 120 according to the turn-on operation of the first switching part 151, and thus, receives the first signal from the first port 121.

After the output of the first signal is detected, the transmission and reception signal detecting apparatus 100 may be in a second operation in operation S503. In the second operation, the transmission and reception signal detecting apparatus 100 operates under the second operation condition.

Under the second operation condition, an output of the second signal is detected from signals transmitted from the directional coupler 120. The second operation is illustrated in FIG. 4.

The control part 160 connects the other end of the first switching part 151 to the end P2 of the first terminator 152 to perform the second operation.

Then, the control part 160 connects the other end of the second switching part 153 to an end of the voltage detector 155.

To this end, the control part 160 outputs a turn-off switching signal to the first switching part 151 such that the first switching part 151 is connected to the first terminator 152.

In addition, the control part 160 outputs a turn-on switching signal to the second switching part 153 such that the second switching part 153 is connected to the end P3 of the voltage detector 155.

In operation S504, the voltage detector 155 receives the second signal transmitted by a turn-on operation of the second switching part 153 and detects an output of the second signal.

That is, the voltage detector 155 is connected to the second port 122 of the directional coupler 122 according to the turn-on operation of the second switching part 153, and thus, receives the second signal from the second port 122.

Accordingly, the voltage detector 155 detects an output of the second signal, and outputs a detection value of the second signal to the control part 160.

In operation S505, the control part 160 receives the detection values of the first and second signals sequentially detected by the voltage detector 155, and uses the detection values to measure the VSWR, thereby checking performance of the antenna 505. The VSWR may be determined using Equations 1 and 2.

Thus, since the transmission and reception signal detecting apparatus 100 can accurately detect the outputs of the first and second signals through the signal detecting part 150, the first and second detection values provided to the tuner 130 are accurate, thereby improving the accuracy of impedance matching of the antenna 140.

Since the transmission and reception signal detecting apparatus 100 includes the voltage detector 155 that sequentially detects outputs of the first and second signals, manufacturing costs thereof can be reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transmission and reception signal detecting apparatus comprising:
    a directional coupler including a first port and a second port; and
    a signal detecting part connected to the first and second ports of the directional coupler and detecting a first signal transmitted through the first port and a second signal transmitted through the second port,
    wherein the signal detecting part comprises:
        a first switching part connected to the first port of the directional coupler;
        a second switching part connected to the second port of the directional coupler; and
        a voltage detector electrically connected to an end of the first switching part and an end of the second switching part,
    wherein the voltage detector is connected to the first port by the first switching part under a first operation condition,
    wherein the voltage detector is connected to the second port by the second switching part under a second operation condition, and
    wherein the first switching part is turned on and the second switching part is turned off under the first operation condition, and the voltage detector detects an output of the first signal transmitted through the first switching part.

2. The transmission and reception signal detecting apparatus according to claim 1, wherein the first signal is a transmission signal that is transmitted through an antenna, and
    the second signal is a reflected wave signal that is received through the antenna.

3. The transmission and reception signal detecting apparatus according to claim 1, wherein the signal detecting part measures a voltage standing wave ratio (VSWR) using detection values of the first and second signals sequentially obtained according to the first and second operation conditions.

4. The transmission and reception signal detecting apparatus according to claim 1, wherein the signal comprises a radio frequency (RF) transmission and reception signal.

5. The transmission and reception signal detecting apparatus according to claim 1, wherein the first switching part is turned off and the second switching part is turned on under the second operation condition, and
    the voltage detector detects the output of the second signal transmitted through the second switching part.

6. The transmission and reception signal detecting apparatus according to claim 1, wherein at least one of the first and second switching parts comprises a single pole two throw (SP2T) switch.

7. The transmission and reception signal detecting apparatus according to claim 1, further comprising:
    a first terminator electrically connected to the other end of the first switching part; and
    a second terminator electrically connected to the other end of the second switching part.

8. The transmission and reception signal detecting apparatus according to claim 7, wherein at least one of the first and second terminators comprises a termination resistor of about 50Ω.

9. The transmission and reception signal detecting apparatus according to claim 7, wherein the first terminator is electrically connected to the first switching part under the second operation condition, and
    the second terminator is electrically connected to the second switching part under the first operation condition.

10. A transmission and reception signal detecting method comprising:
    setting a first operation condition;
    detecting, by a voltage detector, a first signal that is output through a first port of a directional coupler according to the first operation condition;
    changing the first operation condition to a second operation condition; and
    detecting, by the voltage detector, a second signal that is output through a second port of the directional coupler according to the second operation condition, wherein the voltage detector is a single detector;
    wherein the setting of the first operation condition comprises:
        outputting a first switching signal for turning a first switching part on; and
        outputting a second switching signal for turning a second switching part off.

11. The transmission and reception signal detecting method according to claim 10, wherein the setting of the second operation condition comprises:
    outputting a third switching signal for turning the first switching part off; and
    outputting a fourth switching signal for turning the second switching part on.

12. The transmission and reception signal detecting method according to claim 11, further comprising connecting a terminator to an end of the first switching part or the second switching part according to the set operation condition.

\* \* \* \* \*